(12) United States Patent  
Odabas

(10) Patent No.: US 12,059,626 B2  
(45) Date of Patent: Aug. 13, 2024

(54) GENERATION OF VIRTUAL ELEMENTS AND QUEUE THEREOF IN A FITNESS-BASED GAME

(71) Applicant: Meric Odabas, Raton, FL (US)

(72) Inventor: Meric Odabas, Raton, FL (US)

( * ) Notice: Subject to any disclaimer, the term of this patent is extended or adjusted under 35 U.S.C. 154(b) by 232 days.

(21) Appl. No.: 17/709,500

(22) Filed: Mar. 31, 2022

(65) Prior Publication Data

US 2023/0311007 A1 Oct. 5, 2023

(51) Int. Cl.
| | | |
|---|---|---|
| A63F 13/795 | (2014.01) | |
| A63F 13/35 | (2014.01) | |
| A63F 13/65 | (2014.01) | |
| A63F 13/816 | (2014.01) | |

(52) U.S. Cl.
CPC ............ *A63F 13/795* (2014.09); *A63F 13/35* (2014.09); *A63F 13/65* (2014.09); *A63F 13/816* (2014.09)

(58) Field of Classification Search
CPC ........ A63F 13/795; A63F 13/35; A63F 13/65; A63F 13/816; A63F 13/212
USPC .......................................................... 463/7
See application file for complete search history.

(56) References Cited

U.S. PATENT DOCUMENTS

| | | | | |
|---|---|---|---|---|
| 8,990,006 B1* | 3/2015 | Wallace | ............... | G01C 22/006 701/408 |
| 9,304,895 B1* | 4/2016 | Shahrzad | ............ | G06F 11/3668 |
| 10,486,059 B1 | 11/2019 | Golden et al. | | |
| 10,571,863 B2 | 2/2020 | Bostick et al. | | |
| 11,007,429 B2 | 5/2021 | Franceus et al. | | |
| 2005/0192852 A1* | 9/2005 | Sorensen | ......... | G06Q 10/06375 705/14.1 |
| 2012/0253487 A1* | 10/2012 | Dugan | .................. | A63F 13/211 700/91 |
| 2013/0345839 A1* | 12/2013 | Stephens | .................. | A61B 5/22 700/92 |
| 2014/0244008 A1* | 8/2014 | Kennett | ............... | A63F 13/798 700/91 |
| 2014/0371887 A1* | 12/2014 | Hoffman | ............... | A61B 5/1118 700/91 |
| 2015/0081465 A1* | 3/2015 | Dyment | ................. | G06Q 50/01 705/26.1 |
| 2017/0095732 A1 | 4/2017 | Ghaffari et al. | | |
| 2017/0216675 A1 | 8/2017 | Goslin et al. | | |
| 2019/0163270 A1* | 5/2019 | Da Silva | ............... | A61B 5/486 |
| 2021/0133896 A1* | 5/2021 | Magariello | ......... | G07F 17/3251 |
| 2021/0319873 A1* | 10/2021 | Kennedy | ............... | G16H 20/30 |
| 2021/0352261 A1 | 11/2021 | Watson et al. | | |
| 2022/0203165 A1* | 6/2022 | Lee | .................... | A63B 71/0622 |
| 2022/0384027 A1* | 12/2022 | Kaleal, III | ............... | A61B 5/11 |
| 2023/0116624 A1* | 4/2023 | Tang | ................... | G06V 10/803 482/9 |

(Continued)

*Primary Examiner* — Michael A Cuff

(57) ABSTRACT

A computer-implemented method for generating virtual elements in a fitness-based game. The method comprises hosting, by a game server, a fitness-based gaming module and receiving, by the game server, fitness data from one or more devices of a user. The method also comprises generating, by one or more processors, a plurality of battle options, within the fitness-based gaming module, based at least in part upon the fitness data. The method further comprises generating, by the one or more processors, a battle queue of one or more of the plurality of battle options and transmitting, by the game server, the battle queue to the user.

20 Claims, 8 Drawing Sheets

(56) References Cited

U.S. PATENT DOCUMENTS

2023/0191231 A1\* 6/2023 Putnam ................ A61B 5/0816
482/8

\* cited by examiner

GENERATION OF VIRTUAL ELEMENTS AND QUEUE THEREOF IN A FITNESS-BASED GAME

FIELD

The present disclosure relates to gaming systems, and more specifically, to a fitness-based gaming system.

BACKGROUND

The gaming industry includes location-based games. Such location-based games incorporate real world geography and the physical location of the player to enhance the player's overall gaming experience. Some location-based games key certain items and/or events in the virtual world to a particular location in the real world. Other location-based games, often referred to as parallel reality games, include a virtual world that parallels the real world. The virtual world can have virtual recreations of buildings, statues, objects, or other geographical elements which exist in the real world.

In the fitness industry, it is known to incorporate various types of technology to monitor and record the performer's vitals and fitness goals. For instance, various wearable electronic devices exist to record the performer's heart rate and blood pressure. After performance of a given activity, the performer may review and share their performance. Thereby, the performer may be further encouraged to maintain and achieve their fitness goals through the positive reinforcement of personal and peer review.

SUMMARY

In one exemplary embodiment, there is provided a computer-implemented method for generating virtual elements in a fitness-based game. The method includes the steps of hosting, by a game server, a fitness-based gaming module and receiving, by the game server, fitness data from one or more devices of a user. At least one device of the one or more devices comprises one or more sensors configured for sensing the fitness data. The method also includes generating, by one or more processors, a plurality of battle options, within the fitness-based gaming module, based at least in part upon the fitness data. The method further includes generating, by the one or more processors, a battle queue of one or more of the plurality of battle options, and transmitting, by the game server, the battle queue to the user.

In another exemplary embodiment, there is provided a computer-based system for implementing a computer-implemented method of gaming. The system comprises a game server that comprises one or more computer-readable media, one or more processors, and a network interface. The game server is configured for hosting a fitness-based gaming module and receiving, by the network interface, fitness data from one or more devices of a user. At least one device of the one or more devices comprises one or more sensors configured for sensing the fitness data. The game server is also configured for generating, by the one or more processors, a plurality of battle options within the fitness-based gaming module based at least in part upon the fitness data. The game server is further configured for generating, by the one or more processors, a battle queue of one or more of the plurality of battle options and transmitting, by the network interface, the battle queue to the user.

In yet another exemplary embodiment, there is provided a non-transitory computer-readable medium storing instructions that, when executed by one or more processors, cause the one or more processors to perform a method. The method comprises receiving fitness data from one or more devices of a user. At least one device of the one or more devices comprises one or more sensors configured for sensing the fitness data. The method also comprises generating a plurality of battle options within the fitness-based gaming module based at least in part upon the fitness data. The method further comprises generating a battle queue of one or more of the plurality of battle options and transmitting the battle queue to the user.

One possible advantage of the exemplary embodiment is that the in-game elements can be generated using an energy efficient manner to reduce operation costs.

Another possible advantage of the exemplary embodiment is that the fitness data collection and/or generation of the in-game elements may not occur until after the player has completed their fitness activity.

BRIEF DESCRIPTION OF THE DRAWINGS

The embodiments illustrated herein are not limited to the precise arrangements, sequential steps, and dimensions shown. Like numerals indicate like elements throughout the drawings. In the drawings.

DETAILED DESCRIPTION

Figure 1:
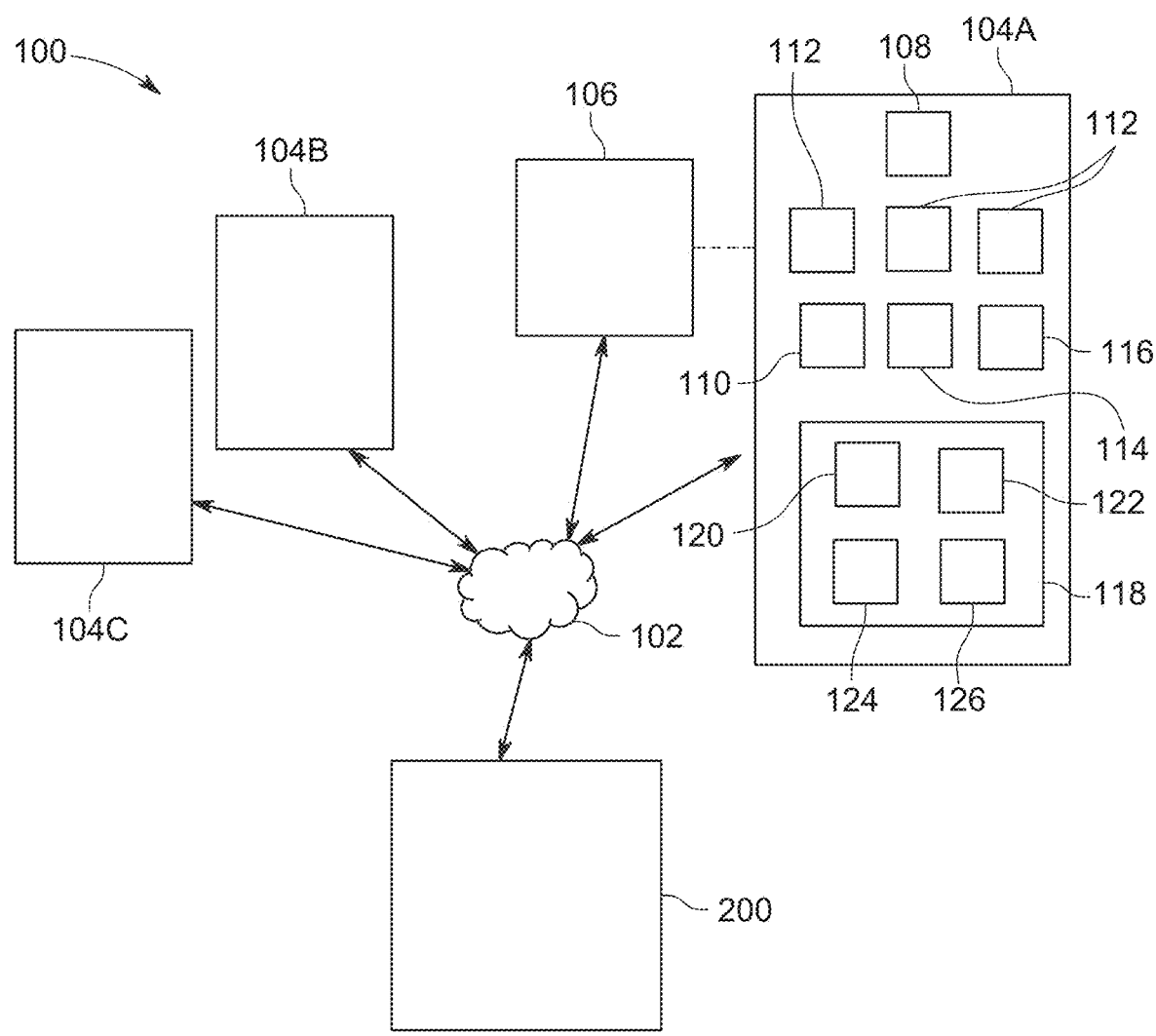
FIG. 1 depicts a computer-based system for implementing a fitness-based game according to an exemplary embodiment of the present disclosure.
Figure 2:
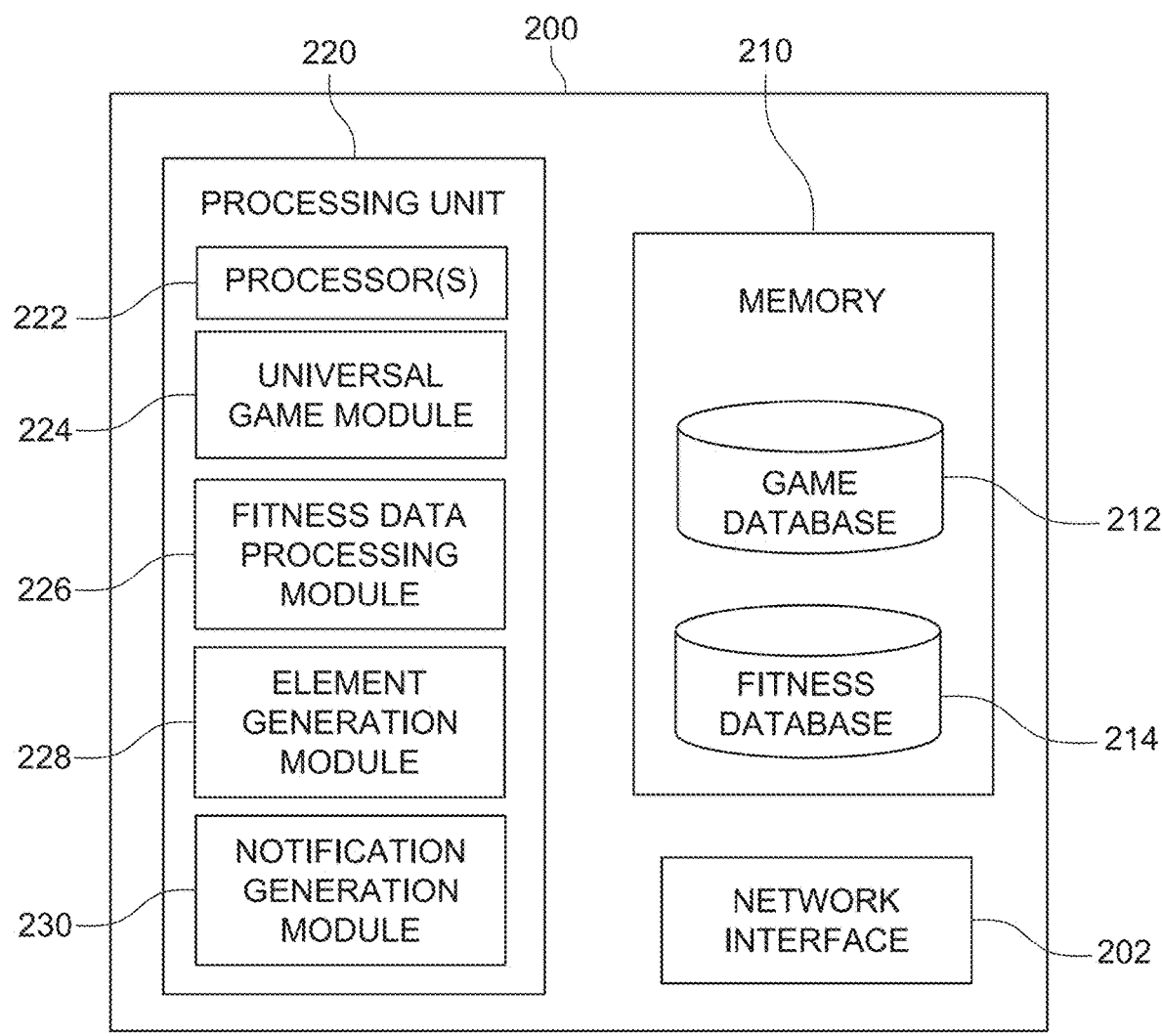
FIG. 2 depicts a game server of the computer-based system FIG. 1.

FIG. 1 illustrates an exemplary computer-based system 100 for implementing a fitness-based game. The system 100 may include a network 102, devices 104A, 104B, 104C, 106 of the players, i.e., users of the fitness-based game, and a game server 200 connected to the devices 104A-C, 106 via the network 102. The system 100 may comprise a fitness gaming application with an integrated video game which is downloadable onto one or more devices 104A-C, 106. The system 100 may encourage exercise by integrating a video game into the entire fitness process. It is conceivable that in other embodiments, the system 100 may include different or additional elements from what is illustrated in FIG. 1.

The system 100 relates exercise to an increase of generating in-game elements when playing the video game. The system 100 may increase the chances of generating battle options when the player exercises, which may accordingly encourage the player to exercise more frequently. For instance, the system 100 may generate battle options which may include various monsters to battle. As used herein, a "battle option" can refer to an option to battle, i.e., virtually fight, one or more in-game characters, such as monsters for the purpose of capturing and collecting the monsters. As used herein, a "monster" can refer to any in-game character.

While not exercising and generating fitness data, the monsters can be battled to capture other monsters. In this way, a fitness activity or fitness session is not interrupted as a video game playing session occurs at a separate time from the fitness activity. Since the video game fitness system 100 is not location-based, but is fitness-based instead, there will not be a reason to be in the same physical and/or virtual location related to any other player, monster, or other in-game element. Thereby, the players may not be advantaged or disadvantaged by residing in any particular location and/or traveling to any particular location.

The network 102 can be any type of communications network, such as a local area network (LAN), wide area network (WAN), a public network, and/or some combination thereof. In general, communication between the game server 200 and the various devices 104A-C, 106 may occur via any desired network interface using any type of wireless connection, using a variety of communication protocols (for example UDP, TCP/IP, HTTP, S1v1TP, FTP), encodings or formats (for example HTML, JSON, XML), or protection schemes (for example VPN, secure HTP, SSL).

The devices 104A-C and/or device 106 can be connected to the network 102. The devices 104A-C, 106 can be associated with one or more players and/or with one another. A single user may have two or more devices 104A, 106, which can be associated with one another as denoted in phantom in FIG. 1. Each device 104A, 106 may communicate with the game server 200 individually via the network 102. Additionally or alternatively, one device 104A may communicate with the network 102, whereas the other additional device 106 may communicate with the device 104A instead of directly with the network 102. Hence, at least one of the devices 104A, 106, or both, may communicate with the game server 200, e.g., one or more components thereof, via the network 102.

The various client devices 104A-C, 106 may or may not be identical to one another. By way of example only, one player may have a smartphone 104A and a wearable device 106, such as a smartwatch, that is connected to the smartphone 104A and/or the network 102. It should be appreciated that the player may only have a smartphone 104A-C, have both smartphone 104A-C and wearable device(s) 106, or just a wearable device 106.

As illustrated with respect to device 104A in FIG. 1, each device 104A-C may include input/output devices 108, e.g., a display screen, speakers, a local data storage 110, one or more sensors 112, one or more fitness applications 114, a notification module 116, and a fitness gaming application 118.

The one or more devices 106 associated with the user, in addition to or separate from the device 104A-C, may include input/output devices, e.g., a display screen, lights, speakers, etc., a local data storage, one or more sensors, a fitness application, which may or may not include a fitness data collection module, a notification module, and/or a fitness gaming application. The various components of the device 106 may be in the form of, or function similarly to, the various components of devices 104A-C, as described herein. The additional device 106 may or may not include the fitness gaming application 118. For instance, in the case where the device 104A is in the form of a smartphone 104A and the device 106 is in the form of a wearable device 106, the wearable device 106 may not include the fitness gaming application 118 in addition to the smartphone 104A. The devices 104A-C, 106 may also include other components known to those skilled in the art. Therein, the devices 104A-C, 106 may include any desired hardware and/or software for generating fitness data.

It should be appreciated that each user may have one or more devices 104A-C, 106 that may be stationary, portable, and/or wearable. As discussed above, the devices 104A-C may be in the form of smartphones and the device 106 may be in the form of a wearable device, such as a smartwatch or smart shoes. However, the devices 104A-C, 106 may also be in the form of a computer, a tablet, a navigation system, a handheld GPS system, user equipment (UE), a portable gaming device, a digital music player, a media player head-mounted display (HMD), a virtual and/or augmented reality headset, smart glasses, smart clothes, smart shoes, data gathering implants, and/or or other suitable data gathering electronic devices. It is conceivable that a device 104A-C may not include sensors 112 for sensing fitness data. Accordingly, such a device may still include the fitness gaming application 118 even though the device does not include the sensors 112. For instance, one device, such as a smartphone, computer, or gaming console, may be used to play the fitness-based game and one or more other devices, such as a wearable device, may include the sensors 112 for sensing the fitness data.

The local data storage 110 can be one or more computer-readable media configured to store data. For example, the local data storage 110 may store the fitness data generated by any desired fitness application and/or fitness collection module. The local data storage 110 may also store any other appropriate data. Furthermore, data may be stored elsewhere (for example, in a distributed database) and accessed remotely via the network 102.

The one or more sensors 112, integrated within the device 104A-C and/or device 106, may include a location sensor, in the form of a positioning device, a speed sensor, an accelerometer, a gyroscope, an altimeter, a pedometer, and/or a heart rate sensor. For instance, the positioning device may monitor the position of the smartphone and/or wearable device 104A-C, 106. In the present embodiment, the one or more sensors 112 include a positioning device, a pedometer, and a heart rate monitor. However, the one or more sensors 112 may include other and/or additional sensors as appreciated by the skilled artisan.

The positioning device can be any device or circuitry; for example, the positioning device may comprise a GPS system, a Galileo positioning system, a Global Navigation satellite system (GLONASS), a BeiDou Satellite Navigation, or a Positioning system. As the player moves around with the device 104A-C, 106 in the physical world, the positioning device can track the position of the player and provide player location data to the fitness gaming application 118.

The fitness application 114 monitors and collects fitness data associated with one or more fitness activities of a player. The fitness application 114 may be part of the device's 104A-C, 106 operating system or additional software installed by the player (e.g., an application installed for use with a wearable device such as a smartwatch or fitness tracker). The fitness application 114 may or may not include a fitness data collection module.

The fitness data may be collected by any appropriate fitness application(s). The fitness data may include activity time, i.e., the time at which a fitness activity starts and finishes, a location of the user, steps, a distance traveled, a heart rate of the player, and/or an amount of time spent exercising which is based upon an elevated heart rate level, both low intensity and high intensity when compared to the player's resting heart rate and/or optimal heart rate. The fitness data may also include values of variables over time, such as periodic (for example, every few seconds or per minute) measures of heart rate or time spent performing a specified exercise continuously. The fitness data may include any data associated with a fitness activity. Additionally, the fitness data may include any data associated with the physical health of the player, whether the data is associated with a fitness activity or a non-fitness activity or normal resting state of the player. The fitness data can be raw data and/or preprocessed data from one or more fitness applications 114.

The notification module 116 notifies, or otherwise presents information to the player, via various visual and/or auditory signals which are known to the skilled artisan. The notification module 116 may comprise any desired software and/or hardware.

The fitness gaming application 118, executed by the device(s) 104A-C, 106, provides an interface between the player and the video game server 200. The fitness gaming application 118 can include a fitness collection module 120, a fitness data extraction module 122, a notification module 124, and/or native plugins 126. In some embodiments, the fitness gaming application 118 may not include native plugins 126; and therein, the fitness gaming application 118 may receive fitness data directly from fitness application(s) 114 of the device 104A-C and/or device 106.

The fitness collection module 120 collects the fitness data. The fitness collection module 120 may be part of the fitness gaming application 118. The fitness collection module 120 may be separate from and/or at least partially incorporated with other fitness collection modules of the device(s) 104A-C, 106. Therein, the fitness collection module 120 can be a part of the fitness gaming application 118 or both of the fitness application 114 and fitness gaming application 118. It is noted that the fitness data may be collected by any appropriate fitness monitoring application in communication with the one or more sensor(s) 112 of the device(s) 104A-C, 106.

The fitness data extraction module 122 extracts fitness data generated by the fitness collection module 120 and sends it to the local data storage 110 and/or the game server 200. The fitness data extraction module 122 may be part of the fitness gaming application 118. In some embodiments, the fitness data extraction module 122 executes a process that periodically checks for updated fitness data. The fitness data extraction module 122 may filter the fitness data based on the source of the fitness data. The fitness data extraction module 122 sends the fitness data, subject to any filtering applied, to the game server 200 in conjunction with an identifier of the corresponding player.

In some embodiments, the fitness data extraction module 122 can extract the fitness data depending on one or more parameters. For instance, the fitness data extraction module 122 may continually extract fitness data at predetermined intervals so that the game server 200 may generate in-game elements in real time. Additionally, for instance, the fitness data extraction module 122 may extract fitness data only after the sensor(s) 112 of the device(s) 104A-C, 106 register a certain heart rate of the player, such as a resting heart rate of the player. The fitness data extraction module 122 may also extract fitness data upon or shortly after downloading the fitness gaming application 118. The game server 200 may determine the player's resting heart rate, e.g., 50-80 bpm, via the fitness collection and extraction modules 120, 122. Alternatively, the game server 200 may store an average heart rate instead of a specific resting heart rate of the player. Thereby, the fitness gaming application 118 and/or the game server 200 may not extract fitness data and/or generate in-game content based on the fitness data without first ensuring the player is finished exercising. Hence, the mental health and/or the safety of the players may be augmented by eliminating various distractions during their fitness activities.

The notification module 124 of the fitness gaming application 118 can be separate from the notification module 116 of the device(s) 104A-C, 106. Alternatively, the notification module 124 of the fitness gaming application 118 may be in the form of, or at least partially incorporated into, the notification module 116 of the device(s) 104A-C, 106. As shown, the fitness gaming application 118 includes a notification module 124 which communicates to the notification module 116 of the device(s) 104A-C, 106. The notification module 124 may receive communication from the game server 200. For instance, the game server 200 may communicate with the notification module 124 when the fitness data, provided by the fitness data extraction module 122, reaches a predetermined level. The notification module 124 may communicate various messages in a variety of manners known to the skilled artisan.

The fitness gaming application 118 also presents a player interface of the game on the display screen(s) of the device(s) 104A-C, 106. Thereby, the fitness gaming application 118 allows the player to interact with the game to perform various game activities. The fitness gaming application 118 also controls various other outputs to allow a player to interact with the video game server 200 without requiring the player to view a display screen. For example, the fitness gaming application 118 may control various audio, vibratory, or other notifications. The fitness gaming application 118 accesses game data to provide an accurate representation of the current state of the game to the player. The fitness gaming application 118 receives and processes player input and provides updates to the game server 200 over the network 102.

In some embodiments, the player must download the fitness gaming application 118 for the video game fitness system 100 onto their device 104A-C and/or 106. As a result, the device(s) 104A-C, 106 can execute software to allow the player to be monitored and fitness data collected. The player can play the game after monsters and/or battle options have been generated in accordance with the video game fitness system 100.

The device 104A-C and/or device 106, for example the fitness data extraction module 122 thereof, can retrieve fitness data in a foreground and/or background process. Continually therewith, in real time, and/or thereafter, in a bulk communication after a preset condition, the fitness data extraction module 122 may send the fitness data to the game server 200. A foreground process is one that the player is actively aware of while using the fitness gaming application 118, whereas a background process performs an operation that is not directly noticed by the player. In a foreground process, the player can have the fitness gaming application 118 open on their device 104A-C, 106 to visually see updates related to their activity.

In a background process, the player can lock their display screen, with the fitness gaming application 118 still open, and/or close the fitness gaming application 118. The background process will continue collecting fitness data. For instance, one or more fitness applications 114 may continue to collect fitness data, and the fitness data extraction module 122 may accordingly receive the fitness data.

By way of example, the fitness gaming application 118 may employ the native plugins 126 to handle the fitness data collection. This way, the native plugins 126 can continue to run in the background to collect the needed fitness data. The native plugins 126 may communicate with the game server 200 when the fitness gaming application 118 is open. When the device 104A-C, 106 and the fitness gaming application 118 are open, the fitness gaming application 118 can be considered to be operating in the foreground mode.

For instance, when the player walks around with the fitness gaming application 118 open, the fitness gaming application 118 itself can collect the fitness data. However, the native plugins 126 can be used to collect the fitness data in the foreground as well as background, and then subsequently send the fitness data to the game server 200 for processing.

In some embodiments, the native plugins 126 accumulate data in the background and send the data to the game server 200 for processing in the background. The player would simply see the updated information when they opened the fitness gaming application 118 again. In accordance with other embodiments, the native plugins 126 accumulate data in the background, then when the fitness gaming application 118 is opened, the native plugins 126 hand over the data to the fitness gaming application 118, and the fitness gaming application 118 itself in the foreground sends the data to the game server 200 to be processed.

Referring now to FIGS. 2-7, the game server 200 includes a network interface 202, a computer-readable storage media 210, such as a memory, and a processing unit 220. The game server 200 hosts the fitness-based game, receives and analyzes inputs, e.g., the fitness data, and provides various game status updates to at least one of the devices 104A-C, 106 of the players. In some embodiments, the game server 200 may contain different or additional elements, and the various functions thereof may be distributed among its various elements in a different manner than described herein.

The network interface 202 establishes communication between the game server 200 and the network 102. The network interface 202 can include any suitable components for interfacing with one or more networks, including, for example, transmitters, receivers, ports, controllers, antennas, or other suitable components.

The memory 210 stores game data and the collected fitness data from the players. The memory 210 may generally include any suitable computer readable media, transitory or non-transitory, for storing instructions. The memory 210 includes a game database 212 and a fitness database 214. The game database 212 and/or the fitness database 214 may be part of the game server 200 or separate from the game server 200 and accordingly be remotely accessed through the network 102. The game database 212 may store information associated with the fitness-based game. The fitness database 214 may store information associated with the fitness and non-fitness activities of the players. In some embodiments, the memory 210 may include a single database, such as a game and fitness database, which stores both fitness and game data.

The processing unit 220 generally includes one or more processors 222 for executing computer-readable instructions. The processing unit 220 may further include a universal game module 224, a fitness data processing module 226, an element generation module 228, and a notification generation module 230.

The one or more processors 222 may comprise any desired software and hardware. The one or more processors 222 may perform the various functions of the processing unit 220 described herein.

The universal game module 224 hosts and generates game content for the players. The universal game module 224 can be referred to as a fitness-based gaming module, wherein the generated virtual content which impacts the game is generated at least in part upon the fitness activity of the players in the real world. The universal game module 224 may access and store data in the game database 212 and the fitness database 214. The universal game module 224 can further govern device connectivity and the security thereof. It is noted that the fitness data processing module 226, the element generation module 228, and/or the notification generation module 230 can be a part of or separate from the universal game module 224.

The fitness data processing module 226 may receive fitness data associated with the fitness activity of the players, by way of the various sensors 112 of the devices 104A-C, 106 of the players. For instance, the fitness data processing module 226 may retrieve fitness data by a background process of the one or more devices 104A-C, 106 of the player. The fitness data processing module 226 may also process the fitness data. Therein, the fitness data processing module 226 may determine a type of fitness activity, a duration of a fitness activity, a resting heart rate of a player, a resting heart rate range of a player, an average heart rate, an optimal heart rate or optimal heart rate range of one or more players, the number of steps of the player in a fitness activity, an average number of steps of the player within a certain time period, a distance traveled of the player, and/or any other desired fitness metric associated with the fitness activity of the players.

For example, considering the heart rate of the player, the fitness data processing module 226 may determine one or more parameters related to a duration of elevated heart rate, a heart rate intensity, and/or an optimal heart rate for subsequently generating battle options. The optimal heart rate may be a precalculated parameter or may be individually calculated for each player by evaluating the player's resting and active heart rates. The fitness data processing module 226 may determine a primary parameter, such as whether the heart rate of the player is active, e.g., 80-220 bpm, and a secondary parameter, such as the particular heart rate of the player at a given time within the fitness activity, which together may be used to generate in-game content. The secondary parameter can be keyed to a multiplication factor which in turn increases the battle option generation rate. The fitness data processing module 226 may also determine a first factor based on the heart rate of the user and a second factor based on an optimal heart rate. The optimal heart rate factor can be greater than the actual heart rate factor. For instance, the game module 224 may grant a 1% chance to generate a battle option for every minute the player exercises, i.e., has an elevated heart rate. The fitness data processing module 226 may generate a first multiplication factor, e.g., 1.2X, based on the heart rate of the user and a second multiplication factor, e.g., 4X, based on an optimal heart rate, or range thereof, of the user. As discussed in more detail below, the element generation module 228 would then generate a greater number of battle options for the player when the player spends more time at or near the optimal heart rate, as opposed to just a heightened heart rate. Therein, a greater number of battle options can be accordingly awarded to players who exercise at an optimal heart rate than those who exercise at a higher intensity and/or for a greater amount of time. Additionally, a diminishing number of battle options may be awarded for certain ranges of heart rates, such as 180 bpm to 220 bpm. Further, a still increasing number of battle options, but at a diminishing rate, may be awarded for certain ranges of heart rates. Hence, those players who may be less physically fit may be awarded a comparable amount to or more battle options than those who are more physically fit.

Additionally, for example, considering the heart rate of the player, the fitness data processing module 226 may determine a first factor for generating the number of monsters and a second factor for generating the rarity of the monsters. For instance, the number of monsters generated may increase based upon the intensity of the heart rate of the player. A lower intensity yields a lower number of monsters, and a higher intensity yields a greater number of monsters. The rarity factor may remain the same or independent of heart rate data. Hence, the odds of receiving a greater number of rare monsters also depends on the number of monsters generated.

Additionally, for example, considering the heart rate of the player, the fitness data processing module 226 may determine one or more rarity factors based on a duration of elevated heart rate, a heart rate intensity, and/or an optimal heart. For instance, the game module 224 may grant a 15% chance to generate a common monster and a 1% chance to generate a rare monster. The fitness data processing module 226 may generate a rarity multiplication factor, e.g., 5X, based on the optimal heart rate. Thereafter, the fitness data processing module 226 may send the optimal heart rate based rarity multiplication factor to the element generation module 228. It is possible that the element generation module 228 may generate a greater number of rare monsters within the battle options for the player when the player spends more time at or near the optimal heart rate, as opposed to just a heightened heart rate or a greater duration of time of an elevated heart rate.

Still further, the fitness data processing module 226 may determine two or more rarity factors for ultimately generating the rarity of the monsters. The fitness data processing module 226 may generate a first multiplication factor based on the duration of time when the player has an elevated heart rate and a second multiplication factor based on the duration of time when the player has an optimal heart rate, or range thereof. The first and second multiplication factors may be weighted differently. Also, the fitness data processing module 226 may add or multiply the first and second multiplication factors. Thereafter, the fitness data processing module 226 may send the first and second multiplication factors, or the combined factor therefrom, to the element generation module 228 for the subsequent rarity value generation of each monster.

Additionally, for example, considering a distance traveled and/or number of steps by the player in a fitness activity, the fitness data processing module 226 may determine an optimal distance to travel and/or an optimal number of steps. For instance, the fitness data processing module 226 may determine the average distance traveled during a fitness activity and accordingly generate an optimal distance traveled, which fluctuates as the player averages more or fewer meters traveled. Furthermore, the fitness data processing module 226 may determine two or more factors which impact battle option generation. For instance, the fitness data processing module 226 may determine a first factor based on the distance traveled, speed, and/or number of steps by the player during a fitness activity and a second factor based on an optimal speed of the player during the fitness activity. The optimal speed factor may be greater than the distance traveled factor, the speed factor, and/or the number of steps factor. Therein, a player that achieves their optimal speed for a greater amount of time may be awarded more battle options than a player that jogs the fastest and/or goes the farthest distance.

Alternatively, the fitness data processing module 226 may generate a speed factor and a distance factor. The fitness data processing module 226 may make the speed factor greater than the distance factor so that a player moving faster, such as a player who runs 1 km, may be awarded more battle options than a player moving slower, such as a player who walks 1 km. The fitness data processing module 226 may also assign a greater value to the distance factor than the speed factor, such that a player traveling a greater distance at a slower pace may receive more battle options than a player traveling a shorter distance at a faster pace.

The element generation module 228 can receive the fitness data from the fitness data processing module 226. The element generation module 228 can generate in-game content, including a variety of in-game elements and features. More specifically, the element generation module 228 may generate battle options within the game module 224 and a battle queue of one or more of the battle options based at least in part upon the fitness data. In generating battle options, the element generation module 228 can create a number of possible battles and/or characters (and characteristics thereof) within the possible battle.

The battle queue may comprise quantity-based battle options and/or monster-based battle options. With quantity-based battle options, the battle queue may comprise a number of monsters and/or a number of rarities associated with particular monsters (which monster(s) may not yet be revealed to the player). Hence, upon selection of a rarity of a monster, i.e., starting an in-game battle, the element generation module 228 may pick a monster corresponding to the chosen rarity. With monster-based battle options, the battle queue may comprise a listing of the monsters themselves. The battle queue of monsters can be generated at the time of processing the fitness data and accordingly stored. Upon selection of a battle option, the game server 200 may battle the corresponding generated monster from the battle queue.

For instance, each battle option may comprise an option to battle a particular rarity of a monster. Hence, the battle queue may comprise a quantity of each rarity category. Therein, the element generation module 228 may generate a listing of the quantities of the rarities of the monsters. When the player starts a battle with a particular rarity, the game server 200 may randomly select a monster, for example of a particular species, which corresponds to the particular rarity chosen by the player. Hence, processing time and data storage may be reduced in storing and communicating only the quantities of the rarities in the quantity-based battle options of the battle queue. Therein, the quantity-based battle queue may reduce the operational cost of the system 100.

Additionally, for instance, each battle option may comprise one or more virtual monsters configured for battling other monsters in the game module 224. The element generation module 228 can generate monsters themselves and therein assign various characteristics thereto, including design (e.g., shape, size, color, and the overall look), various powers, various health and defense attributes, and/or a rarity designation based at least in part upon the fitness data. Additionally and/or alternatively, the element generation module 228 can alter characteristics of existing, or pre-generated, monsters based at least in part upon the fitness data.

As used herein, the rarity and/or commonality associated with a monster can refer to a numerical value of the monster and/or the various characteristics of the monster. For instance, the rarity of a monster may refer to the overall number of monsters in a particular category of monster and/or the unique characteristics, e.g., the strength, health, design, etc., of a particular category of monsters. Additionally, the element generation module 228 can generate both rare and common virtual monsters using a rarity factor and/or a commonality factor, which was generated by the fitness data processing module 226.

The element generation module 228 can generate battle options based on various parameters. The element generation module 228 may generate battle options based on the speed, optimal speed, distance, heart rate, optimal heart rate, and/or rarity factors from the fitness data processing module 226. The element generation module 228 may generate battle options based solely on heart rate data. It is possible that the element generation module 228 may generate a number of battle options based on the fitness data, wherein the battle options have a predetermined rarity. The rarity value, or rarity factor which is used to determine the rarity value of each monster, may or may not be dependent upon the fitness data. It is also possible that the element generation module 228 may generate a number of battle options and a rarity thereof, wherein both the number and rarity of the battle options are based on the fitness data. The element generation module 228 may generate a number of monsters based at least in part upon fitness data, and thereby increase or decrease the number of monsters generated.

Additionally, the element generation module 228 may determine which factor from the fitness data processing module 226 to use based on fitness data, such as previously recorded fitness data. Thereby, for the same fitness activity the element generation module 228 may award a greater or lesser number of battle options to the player(s) based on a present physical fitness of the player. In this regard, the element generation module 228 may award a player for doing more intense exercise and/or equalize the playing field by awarding players equally for a distance traveled, regardless of their speed.

Furthermore, the element generation module 228 may generate a rarity value and assign it to the monsters depending at least in part upon the fitness data. For instance, the element generation module 228 can receive a rarity factor, which is generated from the fitness data processing module 226. Thereafter, the element generation module 228 can accordingly generate a number of monsters and a rarity value for each monster depending upon the rarity factor. Hence, the number of monsters and their rarities can be based at least in part upon the fitness data.

For example, active time and the optimal heart rate bpm of the player may both be parameters for determining a probability factor for a number of generated battle options and/or a probability factor for a rarity of the monsters within the battle options. Hence, instead of assigning a number of monsters generated at a particular heart rate, for instance zero battle options at a resting heart rate, e.g., 50 bpm, and 50 battle options at an active heart rate, e.g., 100 bpm, the element generation module 228 can assign a monster generation probability factor, e.g., a 2% probability factor, to a determined heart rate, from the fitness data processing module 226, or alternatively a standard optimal heart rate. This probability factor can be multiplied by the distance traveled and/or the exact and/or average time at which the player was at their specific optimal heart rate. Furthermore, the element generation module 228 may generate a maximum number of battle options when the player reaches the optimal heart rate and/or spends a certain period of time at or above the optimal heart rate.

Figure 3:
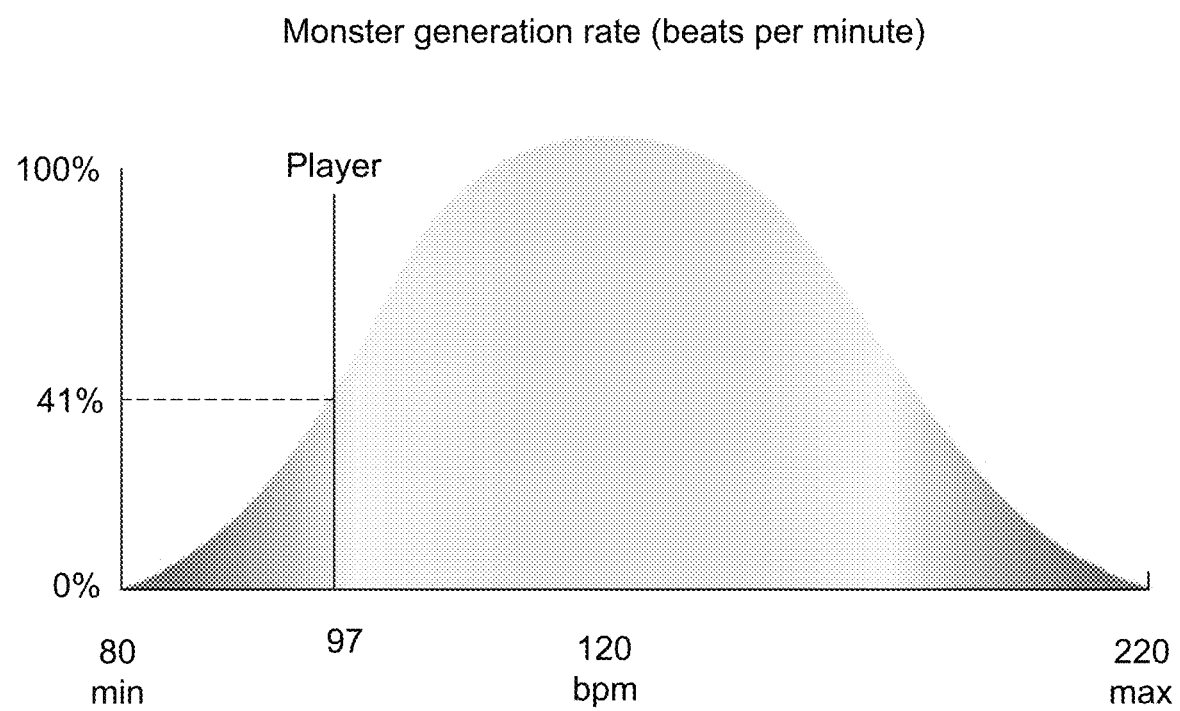
FIG. 3 depicts a graph illustrating in-game element generation rates in relation to the heart rate data.
Figure 4:
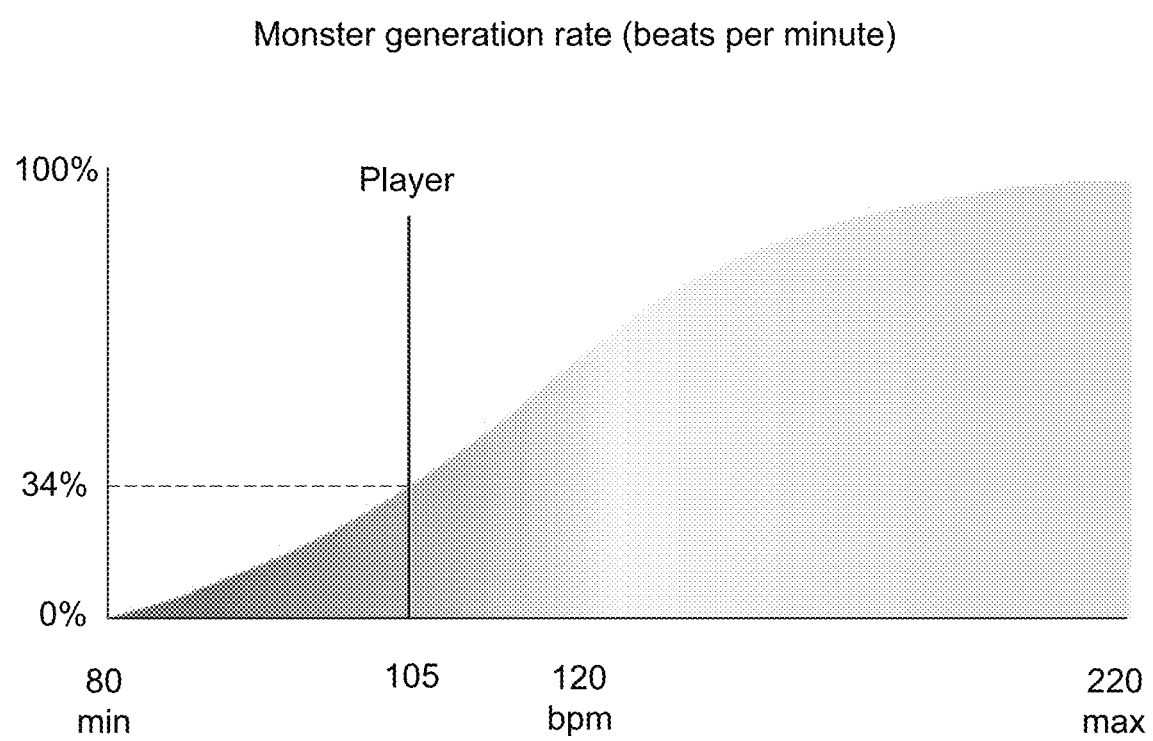
FIG. 4 depicts another graph illustrating in-game element generation rates in relation to the heart rate data.

Referring now particularly to FIGS. 3-4, the element generation module 228 may adjust the battle option generation rate in accordance with a desired algorithm. The element generation module 228 may be keyed to a particular parameter, a set of parameters, or increase linearly in relation to the heart rate of the player. The element generation module 228 may determine a particular algorithm to use, for instance a parabolic curve optimized for the optimal heart (FIG. 3) or an asymptotic logistic curve optimized for heart rate intensity (FIG. 4), based on the fitness data of the player(s). Thereby, the game server 200 can better incentivize an individual player depending upon their fitness level within a given week, a month, a year, etc. Also, the game server 200 can create artificial handicaps for certain players based on their fitness level.

As shown in FIG. 3, by way of example only, the probability factor for battle option generation may be parabolic with the vertex thereof (and maximum probability factor) being keyed to the optimal hear rate bpm, e.g., 100 bpm, of the player. As shown on the X-axis, the heart rate ranges from a minimum of 80 bpm to a maximum of 220 bpm. As shown on the Y-axis, the battle option generation rate ranges from a minimum of zero to a set maximum. The set maximum could be any desired probability factor. For example, the set maximum could be a 5%, 20%, 50%, 100%, or greater probability factor. In this example of a parabolic function, a player who is more physically fit may not receive a greater number of monsters than a player who is not as physically fit. In essence, the player who is not as physically fit is more incentivized than the player who is more physically fit.

As shown in FIG. 4, by way of example only, the probability factor for battle option generation may be modeled using an asymptotic logistic curve, with the generation of battle options tapering slightly as heart rate intensity increases. The heart rate and the battle option generation rate are displayed on the X-axis and Y-axis, respectively. In this example, the difference between a 180 bpm and 220 bpm is nearly indistinguishable in its effect on the battle option generation rate. Thereby, players who are more physically fit are awarded a greater number of battle options upon entering a high heart rate bpm range, above which the generation rate tapers off and an incremental increase in the rate becomes negligible.

It should be understood that the element generation module 228 generates in-game elements on the game server 200. Therein, a possible advantage of the element generation module 228 is that the negative effect of cheating by players can be mitigated. Players may not be allowed to input certain parameters, like their age, weight, goals, etc., and hence, the generation of in-game elements may not depend on falsified information which is inputted by a player. Hence, the system 100 improves the gaming industry in that it offers a fair gaming application.

Figure 5:
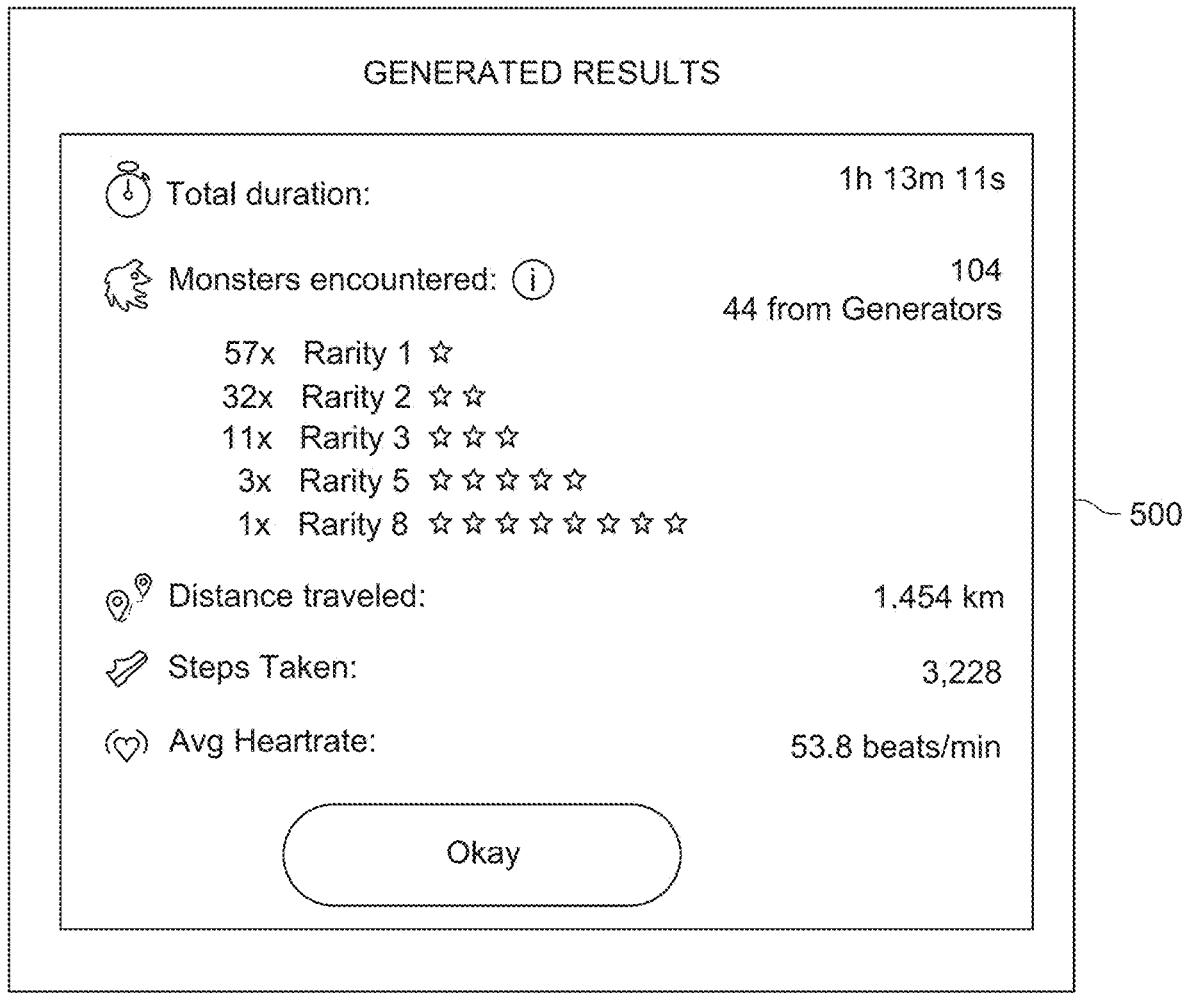
FIG. 5 depicts a summary of generated results, including the battle options, which were generated by the game server.

As shown in FIG. 5, the element generation module 228 may generate a summary of one or more fitness activities and generated results 500, which may then be shown to the player via their devices 104A-C, 106. Therein, the element generation module 228 may show the overall number of rarities and/or number of monsters generated during the player's fitness activity. The player may be shown the number and rarity of monsters they were "awarded", "found", or "encountered", which refers to the various monsters in the battle options generated for the player as a result of their fitness activity. As shown, the element generation module 228 may generate a total of one hundred and four battle options, e.g., monsters, which includes fiftyseven Rarity 1 monsters, three Rarity 5 monsters, and only one Rarity 8 monster to battle based on a fitness activity of the player (FIG. 5). As discussed below, the same number or a lessor number of the generated battle options may then be listed into the battle queue.

The battle queue may be generated at least in part upon the fitness data. For instance, the battle queue may be generated solely on the basis of heart rate data. Hence, the element generation module 228 can determine the number of battle options included in the battle queue, based at least in part upon the fitness data. In other words, the game module 224 and/or element generation module 228 can use all or create a partial number of the total number of battle options generated, wherein the determination, e.g., deduction in battle options, is dependent upon the fitness data. For instance, the battle queue may contain fewer battle options than the total number of battle options generated due to a lower than average heart rate of the player during a given fitness activity.

Figure 6:
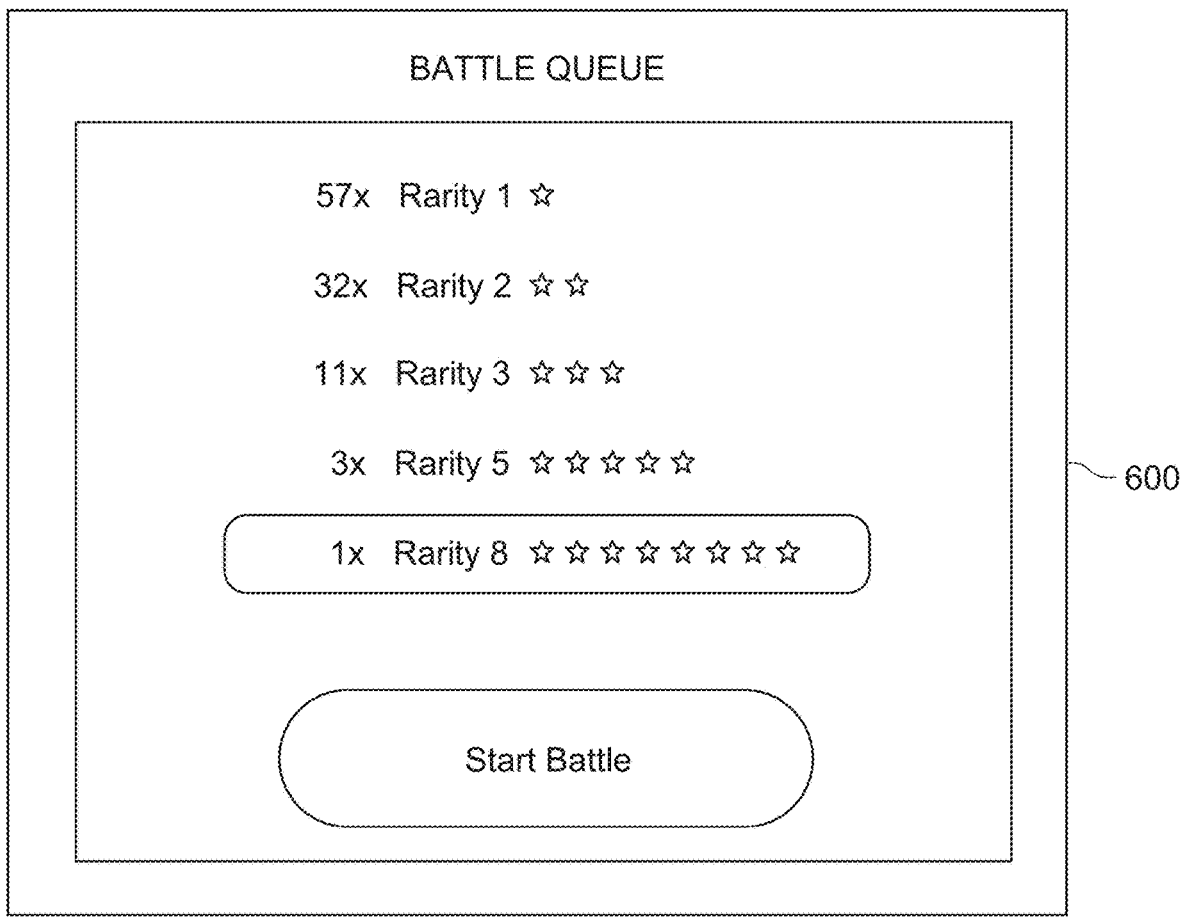
FIG. 6 depicts a time-independent battle queue of the battle options generated by the game server.
Figure 7:
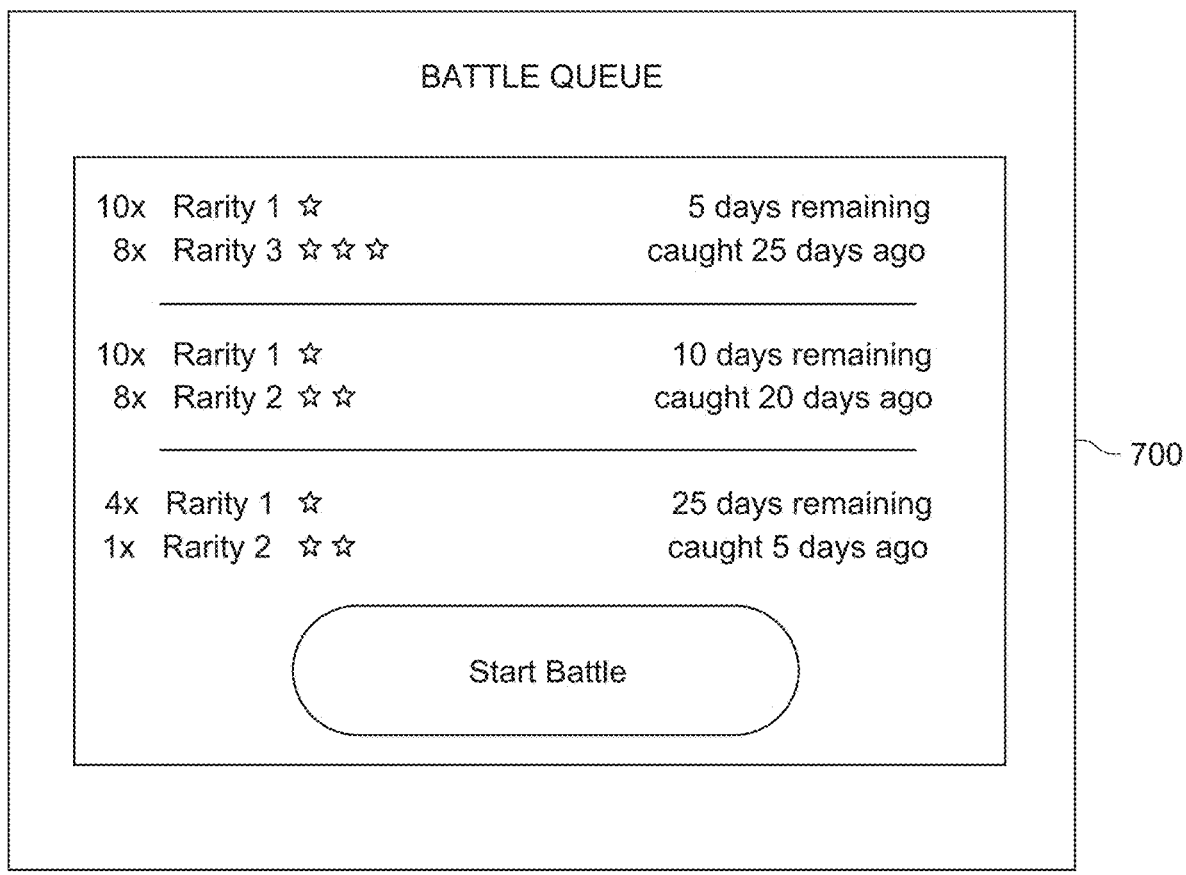
FIG. 7 depicts a time-dependent battle queue of the battle options generated by the game server.

Referring now particularly to FIGS. 6-7, the element generation module 228 can make the battle queue and/or one or more battle options therein time-independent or time-dependent. The battle queue may comprise quantity-based battle options, such as the rarities of the monsters, and/or monster-based options, such as the category or type of monsters.

In some embodiments, the element generation module 228 can generate a time-independent battle queue 600 that is not time sensitive such that the battle options therein do not expire after a set period of time (FIG. 6). It is noted that the element generation module 228 may or may not generate the battle queue based at least in part upon fitness data. As shown, the battle queue 600 displays a queue comprised of quantity-based battle options, and more specifically the quantities of the rarities of the monsters.

In some embodiments, the element generation module 228 may generate a time-dependent battle queue 700 (FIG. 7). Therein, the generated monsters must be battled within a predetermined time period, or they will disappear. The expiry time (i.e., how much time is left before expiration) may depend upon the fitness data. For instance, the element generation module 228 can generate an initial expiry time, which may or may not be based at least in part upon the fitness data. Thereafter, the element generation module 228 can extend or shorten the expiry time based at least in part upon fitness data. For instance, if the player does an additional fitness activity within a certain time period, the element generation module 228 may extend the expiry time so that the battle option(s) within the battle queue 700 last(s) for a greater amount of time. The element generation module 228 can also generate an entirely new subsequent expiry time to replace the initial expiry time, based at least in part upon the fitness data. The time-dependent battle queue 700 may encourage game play, which in turn may encourage more exercise based upon the desire to win and obtain more powerful and rare monsters.

The notification generation module 230 may notify the players about the various in-game events which were generated as a result of their fitness activity. The notification generation module 230 may comprise any desired hardware and software. The notification generation module 230 may display a summary of the fitness activity, a summary of the battle options, and rarities and/or monsters therein, and the battle queue which were generated as a result of the one or more fitness activities of the players. The notification module 230 may communicate various messages in a variety of manners known to the skilled artisan.

For instance, the notification module 230 may display a battle icon. The battle icon may be displayed on the main page of the game. The battle icon may also open a popover of the generated battle queue. The notification generation module 230 can further generate an option to select, as determined by the element generation module 228, one or more battle options within the battle queue via the display of the device(s) 104A-C, 106. This option to select, and thereby battle the monsters, may be independent from the fitness activity associated with the previously gathered fitness data. By way of example, the notification module 230 can display a battle queue for the degree of rarity of a monster to battle. Then, the players may select which rarity of monster they wish to battle. A player may choose the rarest monsters to battle, instead of the less rare battle options, and then be incentivized to do more fitness to receive a greater number of rare monsters, without the need of conducting numerous in-game battles.

The notification generation module 230 may prevent the notification of the generated in-game content from the game server 200 depending on one or more parameters. For instance, the notification generation module 230 may only notify the player after the sensor(s) 112 of the device(s) 104A-C, 106 register a certain heart rate of the player, such as a resting heart rate of the player. Hence, the notification generation module 230 may assure that the player is not distracted during their fitness activity.

Figure 8:
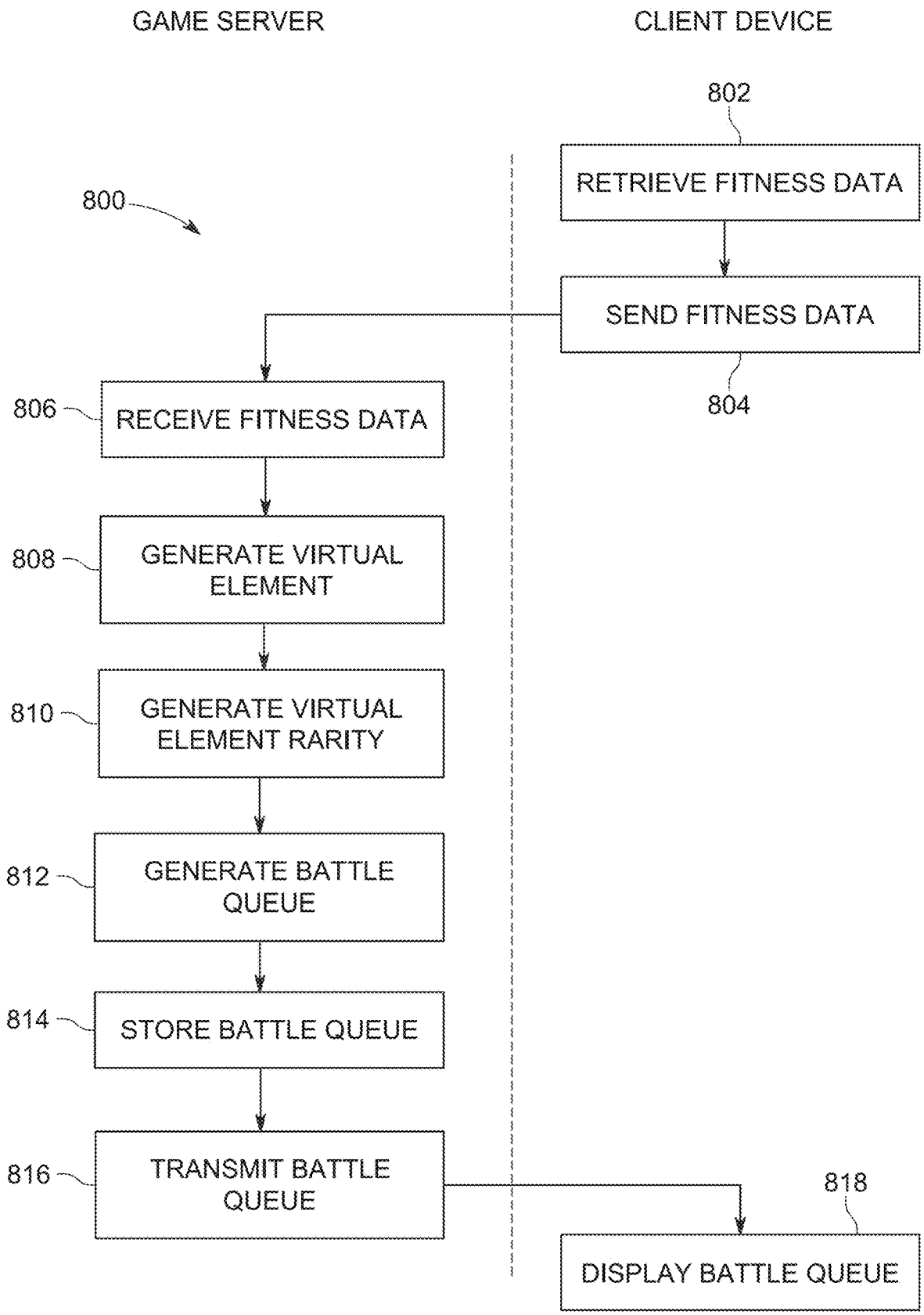
FIG. 8 illustrates a flowchart of a computer-implemented method for generating in-game elements.

Referring now specifically to FIG. 8, there is shown a flowchart of a computer-implemented method 800 according to an exemplary embodiment of the present disclosure. The fitness data can be sensed and accordingly retrieved by at least one device of the one or more devices 104A-C, 106 of the players (at step 802). In a background or foreground process, the device(s) 104A-C, 106 may send the fitness data to the network 102 (at step 804). The game server 200 may then receive the fitness data (at step 806). Then, by one or more processors 222, one or more virtual elements can be generated (at step 808). For example, the element generation module 228 can generate battle options that are based at least in part upon the fitness data. One or more processors 222 may additionally generate the rarity value of each virtual element (at step 810). For example, the element generation module 228 may use a predetermined rarity of monsters which may or may not be based upon the fitness data. Additionally, for example, the element generation module 228 may generate the rarity value of each virtual element based at least in part upon the fitness data. Yet, it is conceivable that the method 800 may not include the step of generating rarity values. One or more processors 222 may additionally generate a battle queue of one or more of the previously generated virtual elements (at step 812). For example, the element generation module 228 can generate a battle queue of some or all of the battle options so that the player may battle the monsters from the battle options. The memory 210, for instance within the game database 212, may store the battle queue (at step 814). The battle queue, and/or individual battle options therein, may be stored for a finite or infinite period of time. Thereby, the player may complete their fitness activity without distraction and choose to battle the monsters at will. The game server 200 can transmit the battle queue to the device(s) 104A-C, 106 of the player (at step 816). Additionally, the game server 200 can also transmit a summary or listing of the battle options which were generated as a result of a fitness activity. The player's device 104A-C, 106 may accordingly display the battle queue in the fitness gaming application 118 (at step 818).

In some alternative embodiments, the game server 200 may affect the game play and/or the outcome of the battle itself based at least in part upon the fitness data. For instance, the fitness data processing module 226 may determine a secondary factor that may increase or decrease the health, defense, and/or attack power of a monster that was previously generated in a prior battle option. Additionally, for instance, additional rewards, such as in-game items and/or currency may be given to the player based at least in part upon the fitness data. The element generation module 228 may multiply the monster's health, defense, and/or attack power by the secondary factor. The element generation module 228 may also, or alternatively, multiply the player's chosen monster, which was not generated in the previously generated battle options, by the secondary factor. The secondary influence(s) may be stored in the memory 210 and sent to the player's device 104A-C, 106. Such secondary influences may be automatically applied. Alternatively, the player may apply them as a risk-taking endeavor. For instance, the player may make an upward swiping gesture to apply a mystery secondary influence, i.e., unknown to the player, which will in turn impact the game play of the battle and potentially increase the odds of success. The fitness gaming application can quickly apply the secondary influence, and therein, reduce the calculation or processing time involved at the time of gameplay. The gaming application will then display the generated secondary influence and commence the battle. In such a manner, the player may receive an additional advantage when battling the monsters in the battle options by doing additional fitness activity within a certain time period. This may increase the player's confidence in playing the game and also in doing regular exercise as they are positively reinforced during multiple in-game stages. This may also create a snowball effect to help encourage the player to regularly engage in fitness activities.

In some alternative embodiments, the game server 200 may generate time sensitive incentives which are based at least in part upon the fitness data associated with one or more fitness activities of the player. The game server 200 may generate the time sensitive incentives based solely on heart rate data. For instance, the fitness data processing module 226 may calculate a bonus factor, which may provide additional battle options, an increase in rarity generation, in-game items and/or currency, and/or advantageous secondary influences. The bonus factor, and accordingly the bonus influence, can be generated and applied during and/or after the generation of the battle options, rarity, and/or the secondary influences. Furthermore, the bonus factor may be contingent on completing a certain fitness activity within a given time period. The bonus factor can be automatically applied. Alternatively, the bonus factor may be applied in a similar fashion to the manual application of the secondary influence. Accordingly, this may increase the player's confidence as they are positively reinforced during multiple in-game stages.

In some embodiments, the above-described method steps of the method 800 can be executed or performed in any sequence, and thereby is not limited to the sequence as shown and described. Additionally, the method steps of the method 800 can be performed substantially simultaneously, in order to reduce latency and processing times. Additionally, some of the method steps of the method 800 may be entirely omitted.

The method steps of the method 800 can be performed by executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. The method 800 can be performed by one or more processors, a controller, and/or any other desired processing device. The term "software code" used herein refers to any instructions or set of instructions that influence the operation of a computer or controller. Such software code may exist in a computer-executable form, such as machine code, which is the set of instructions and data directly executed by a computer's central processing unit or by a controller, a human-understandable form, such as source code, script, etc., which may be compiled in order to be executed by a processing unit, a controller, or an intermediate form, such as object code, which is produced by a compiler. Furthermore, the software may include, in non-limiting examples, routines, programs, objects, components, and data structures that perform particular tasks or implement particular data types. The server processes may be implemented using a single server or multiple servers working in combination with one another. The server(s), database(s), and software application(s) may be implemented on a single system or distributed across multiple systems.

Other embodiments, which differ from the aforementioned embodiments, may be recognized by those skilled in the art without departing from the scope of the following claims.

The invention claimed is:

1. A computer-implemented method for generating virtual elements in a fitness-based game, comprising:
hosting, by a game server, a fitness-based gaming module;
receiving, by the game server, fitness data from one or more devices of a user generated during gameplay, at least one device of the one or more devices comprising one or more sensors configured for sensing the fitness data;
generating, by one or more processors, a plurality of battle options, within the fitness-based gaming module, based at least in part upon the fitness data;
generating, by the one or more processors, a battle queue of one or more of the plurality of battle options; and
transmitting, by the game server, the battle queue to the user.

2. The computer-implemented method of claim 1, wherein each battle option of the plurality of battle options comprises one or more virtual monsters configured for battling in the fitness-based gaming module.

3. The computer-implemented method of claim 2, wherein generating the plurality of battle options comprises generating a rarity value for each virtual monster.

4. The computer-implemented method of claim 3, wherein generating the rarity value for each virtual monster is determined by a rarity factor which is based at least in part upon the fitness data.

5. The computer-implemented method of claim 1, further comprising displaying an option to select the one or more of the plurality of battle options within the battle queue, wherein the option to select is independent from a fitness activity associated with the fitness data.

6. The computer-implemented method of claim 1, wherein the battle queue is not time sensitive such that the one or more of the plurality of battle options within the battle queue do not expire after a set period of time.

7. The computer-implemented method of claim 1, further comprising retrieving the fitness data by a background process of the at least one device of the one or more devices of the user, wherein retrieving the fitness data and generating the plurality of battle options occur after a fitness activity associated with the fitness data is completed.

8. The computer-implemented method of claim 1, wherein the fitness data comprises a heart rate of the user, and wherein generating the plurality of battle options comprises determining a first factor based on the heart rate of the user and a second factor based on an optimal heart rate, wherein the second factor is greater than the first factor.

9. The computer-implemented method of claim 1, wherein the fitness data comprises a distance traveled and a number of steps of the user, and wherein generating the plurality of battle options comprises determining a first factor based on the distance traveled and a second factor based on an optimal speed of the user during a fitness activity associated with the fitness data.

10. The computer-implemented method of claim 1, wherein generating the battle queue is based at least in part upon the fitness data.

11. A computer-based system for implementing a computer-implemented method of gaming, the system comprising:
- a game server comprising one or more computer-readable media, one or more processors, and a network interface, the game server configured for:
    - hosting a fitness-based gaming module;
    - receiving, by the network interface, fitness data from one or more devices of a user generated during gameplay, at least one device of the one or more devices comprising one or more sensors configured for sensing the fitness data;
    - generating, by the one or more processors, a plurality of battle options within the fitness-based gaming module based at least in part upon the fitness data;
    - generating, by the one or more processors, a battle queue of one or more of the plurality of battle options; and
    - transmitting, by the network interface, the battle queue to the user.

12. The computer-based system of claim 11, wherein each battle option of the plurality of battle options comprises one or more virtual monsters configured for battling in the fitness-based gaming module.

13. The computer-based system of claim 12, wherein generating the plurality of battle options comprises generating a rarity value for each virtual monster.

14. The computer-based system of claim 13, wherein generating the rarity value for each virtual monster is determined by a rarity factor which is based at least in part upon the fitness data.

15. The computer-based system of claim 11, further comprising displaying an option to select the one or more of the plurality of battle options within the battle queue, wherein the option to select is independent from a fitness activity associated with the fitness data.

16. The computer-based system of claim 11, further comprising retrieving the fitness data by a background process of the at least one device of the one or more devices of the user, wherein retrieving the fitness data and generating the plurality of battle options occur after a fitness activity associated with the fitness data is completed.

17. The computer-based system of claim 11, wherein the fitness data comprises a heart rate of the user, and wherein generating the plurality of battle options comprises determining a first factor based on the heart rate of the user and a second factor based on an optimal heart rate, wherein the second factor is greater than the first factor.

18. The computer-based system of claim 11, wherein the fitness data comprises a distance traveled and a number of steps of the user, and wherein generating the plurality of battle options comprises determining a first factor based on the distance traveled and a second factor based on an optimal speed of the user during a fitness activity associated with the fitness data.

19. The computer-based system of claim 11, wherein generating the battle queue is based at least in part upon the fitness data.

20. A non-transitory computer-readable medium storing instructions that, when executed by one or more processors, cause the one or more processors to perform a method, the method comprising:
- receiving fitness data from one or more devices of a user generated during gameplay, at least one device of the one or more devices comprising one or more sensors configured for sensing the fitness data;
- generating a plurality of battle options within the fitness-based gaming module based at least in part upon the fitness data;
- generating a battle queue of one or more of the plurality of battle options; and
- transmitting the battle queue to the user.

* * * * *